United States Patent [19]

Glynn

[11] Patent Number: 5,014,798

[45] Date of Patent: May 14, 1991

[54] PATIENT COMPLIANCE MEDICINE CAP

[75] Inventor: Kenneth P. Glynn, Raritan Township, Hunterdon County, N.J.

[73] Assignee: Tenax-Glynn Corporation, Flemington, N.J.

[21] Appl. No.: 457,177

[22] Filed: Dec. 26, 1989

[51] Int. Cl.⁵ .................... G01G 13/16; G01G 23/18; G01G 19/52; G06F 15/42

[52] U.S. Cl. .................................. 177/25.19; 177/45; 177/50; 177/132; 364/413.02

[58] Field of Search ................ 177/25.19, 45, 50, 132; 364/413.02

[56] References Cited

U.S. PATENT DOCUMENTS

| | | | |
|---|---|---|---|
| 3,347,324 | 10/1967 | Stewart | 177/1 |
| 3,487,886 | 1/1970 | Sunnen | 177/132 |
| 4,223,801 | 9/1980 | Carlson | 221/3 |
| 4,657,095 | 4/1987 | Hardin, Jr. et al. | 177/132 |
| 4,674,652 | 6/1987 | Aten et al. | 364/479 |

Primary Examiner—George H. Miller, Jr.

Attorney, Agent, or Firm—Kenneth P. Glynn

[57] ABSTRACT

The present invention is directed to a cap for a medicine bottle for monitoring a patient's medicine compliance. It involves weighing a container of medicine with cap which includes scale means located therein which is connected to a computer chip with a display unit also located in or on the cap. The chip may store the starting weight or tare weight, plus total weight and when the container or medicine is picked up by the cap at any time, actual weight is fed to the chip. The computer chip may then determine the difference between the starting weight and/or display actual amount of medicine remaining or consumed. The container of medicine is reweighed from time to time with the cap and the chip may compare actual weight with compliance required weight to determine compliance and the cap may visually display the compliance results on the display unit to inform the patient. An optional audio assist may direct the patient to "call the doctor" if a significant compliance deviation is recognized.

16 Claims, 2 Drawing Sheets

PATIENT COMPLIANCE MEDICINE CAP

BACKGROUND OF THE INVENTION

1. Field of the Invention

The present invention is directed to a cap for a medicine container for monitoring a patient's compliance with a medicine regimen. It is directed to compliance monitoring by the patient (self-monitoring) and/or a professional such as a pharmacist, doctor, hospital, clinic or the like. The present invention involves the use of scales and computer chips located within the present invention caps for automatic signaling of content depletion data to a user on demand.

2. Prior Art Statement

The use of precision unique programming, computers and linking peripherals to monitor medicine regimen compliance is an evolving art. Likewise, the use of stand alone medicine containers for compliance monitoring is relatively new to the field of medicine.

U.S. Pat. No. 4,577,710 issued to Edward Ruzumno is directed to an apparatus for promoting good health which involves a personal weight scale and an information and message center which may be used merely for weight control or may be used for specific messages pertaining to a health condition with pretaped feedback from a physician. This recently issued patent represents the concept of patient weight monitoring for general or specific health purposes. However, it does not pertain to medicine regimen compliance, medicine containers with built in scales or computers as in the present invention.

U.S. Pat. No. 4,629,015 issued to Fried et al is also directed to patient weight monitoring and includes a graphic display but is not used for medicine regimen or other patient monitoring nor does it pertain to stand alone systems.

U.S. Pat. No. 3,863,724 to Dalia, Jr. is not directed to health care but to inventory control of alcohol or other dispensed materials. It involves weight difference reading by scale and computer but is neither directed to medicine regimen nor to patient feedback nor is it directed to stand alone dispenser.

U.S. Pat. No. 4,436,223 to Jerry Wilson 1984) describes a stand alone device for recording the dispensing of liquids, and includes a digital readout of usage. However, this device is directed to a count of the number of pours and not the weight of the contents as in the present invention.

U.S. Pat. No. 4,460,106 to Moulding et al (1984) describes a stand alone pill dispenser which includes an electronic counting mechanism with a display located in the cap shell. This does not involve weight data or the use of scales but relies upon a complex mechanical compartment rotation mechanism.

SUMMARY OF THE INVENTION

The present invention is directed to a cap for a medicine bottle for monitoring a patient's medicine compliance. It involves weighing a container of medicine with a cap which includes scale means located therein which is connected to a computer chip with a display unit also located in or on the cap. The chip may store the starting weight or tare weight, plus total weight and when the container of medicine is picked up by the cap at any time, actual weight is fed to the chip. The computer chip may then determine the difference between the starting weight and/or display actual amount of medicine remaining or consumed. The container of medicine is reweighed from time to time with the cap and the chip may compare actual weight with compliance required weight to determine compliance and the cap may visually display the compliance results on the display unit to inform the patient. An optional audio assist may direct the patient to "call the doctor" if a significant compliance deviation is recognized.

BRIEF SUMMARY OF THE DRAWINGS

The present invention, its advantages and objects will be more fully understood when the specification herein is taken in conjunction with the appended drawings hereto, wherein.

DETAILED DESCRIPTION OF THE PRESENT INVENTION

The present invention involves a container cap for medicine containers which enables a patient or a third party user to monitor a patient's compliance with a medicine regimen. Thus, it is an object of the present invention to enable a user or other person to determine whether or not a patient has properly complied with the dosage requirements of a particular prescription. This is accomplished by picking up the medicine container and cap by the cap so that the weight of the container pulls on the cap to provide weight information. This is accomplished by a scale and a computer chip which are built into the cap itself.

Figure 1:
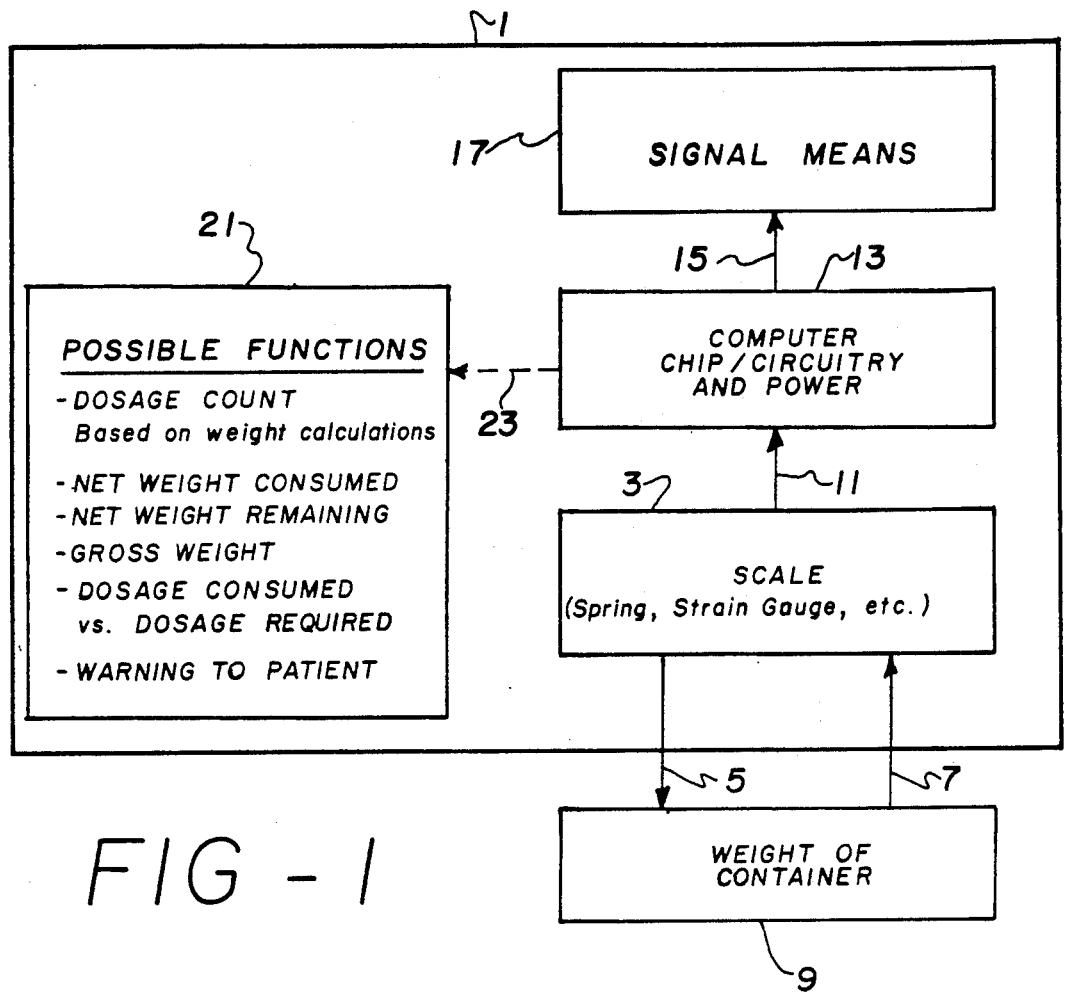
FIG. 1 illustrates a schematic diagram of the functionality of a present invention device.

Referring now to FIG. 1 there is illustrated schematically a present invention cap shown generally as frame 1. This representation of the present invention device contains schematic illustrations of the components and functions. Thus, scale 3 may be a spring scale, a strain gauge scale, or any other known scale mechanism which is connected by lines 5 and 7 to frame 9 which illustrates the weight of the container. Thus, scale frame 3 is connected by line 11 to frame 13 which shows a computer chip, circuitry and power the possible functions include but are not limited to those shown in frame 21 connected by line 23. All of the possible functions relate to weight data and includes dosage count, net weight consumed, net weight remaining, gross weight, dosage consumed vs. dosage required and warning to patient. The patient warning may be corrective directions or may be a directive to procure professional assistance. The computer chip is connected to a signal means connected by line 15 to frame 17.

The signal means may be a visual display device such as an LCD or LED or an audio device alone or in combination with a visual display. The audio aspect may be a simulated voice or a beeper, for example, if a patient is ahead or behind by, for example, two or more medicine dosages an audio feature could direct the patient to call the doctor.

Figure 2:
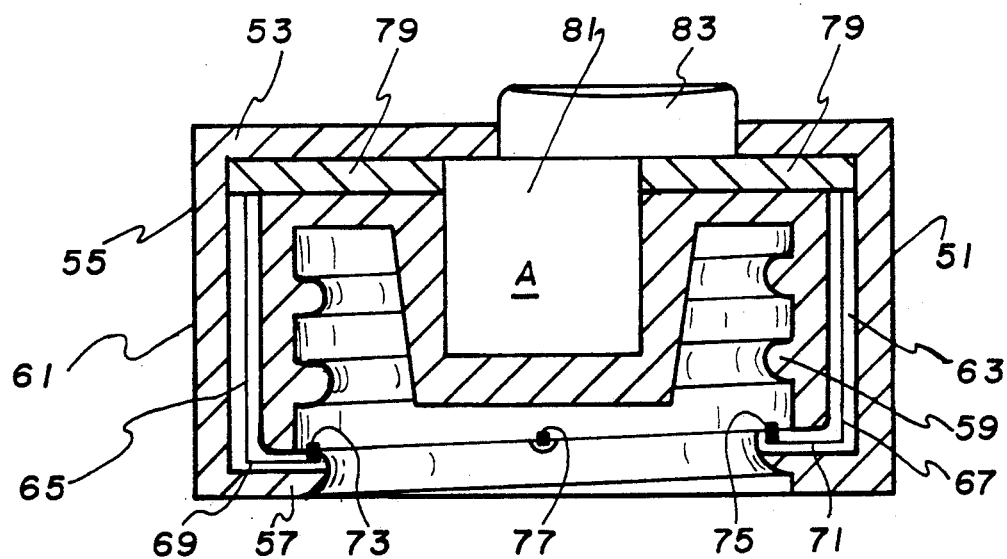
FIG. 2 illustrates a side cut partial view of a medicine cap present invention.

FIG. 2 shows a cut side view of a present invention device. Specifically, cap 51 has a frame 53 with sides 55 and an inward ledge 57. In this particular embodiment, the inward ledge 57 is the lowest thread on a set of threads typified by thread 59. Cap 51 has hollow areas such as 61 and 63 which contain sensitive scale rods 65 and 67. In this embodiment, four scale rods would be utilized and located 90° apart about circular cap 51 and would include an inward protrusion such as protrusions 69 and 71 with contact rest 73 and 75 respectively.

When cap 51 is loosely screwed to a medicine container (not shown) the container and cap 51 may be picked up by cap 51 and the weight of the container will cause downward pressure on contact rests 73, 75, 77 (and a fourth one not shown due to the cut view). Scale rods typified by scale rods 61 and 63 pull down on annular scale register 79 which inturn is read by computer chip 81 of unit A which also contains a miniature battery for power and circuitry to connect the scale register 79 to the computer chip 81 and to connect the computer chip to signal means 83. The computer chip 81 may simply recognize and convert gross weight information; it may be programmed to subtract the tare weight of the container from the gross weight to present the signal means 83 with net weight. Alternatively, rather than determine net weight remaining the chip may start with a total weight of the contents and send signal means 83 net weight consumed.

Figure 3:
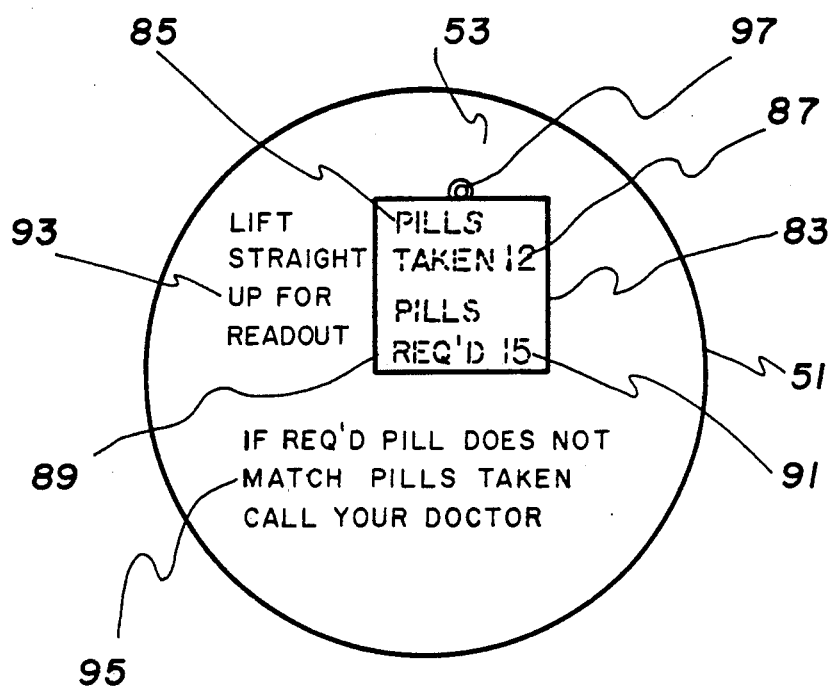
FIG. 3 shows a top view of the device shown in FIG. 2.

FIG. 3 illustrates a top view of the device shown in FIG. 2 wherein cap 51 with top 53 includes signal means 83, in this case an LCD digital display unit. The display unit has a message 85 of "PILLS TAKEN" and a numerical readout 87 as well as a second message 89 of "PILLS REQD" with a numerical readout 91 operational instructions 93 are printed on top 53 of cap 51 and optional patient instructions 95 may likewise be included. Thus, in this embodiment, cap 51 is utilized by a pharmacist or by dispensary personnel as follows; the computer is preprogrammed so that the cap 51 may be used with a specific prescription which is very commonly used, and for a specific size and weight of pill. For example, many elderly people suffer from chronic problems which require three pills per day of a well known medication in a standard dosage unit. When the pharmacy or dispensary provides the medication to the patient, recess start button 97 is simply depressed with a pen to start the timer feature of the computer. At any point thereafter, the computer is counting the number of pills required to be taken and this would be shown as readout 91. At any time after the patient begins using the medicine, the container and cap 51 are lifted up while the patient is holding the cap so that the weight of the container pulls down on rests 73 etc. and registers a weight with the computer so that net weight of pills taken are calculated and shown on display unit 83 as readout 87. Message 95 could direct the patient to call the doctor if pills taken does not match pills required or if there is a deviation of three or more pills to call the doctor. Alternatively, an audio signal such as a warning beeper or even a electronic voice could warn the patient of a dosage deviation.

Figure 4:
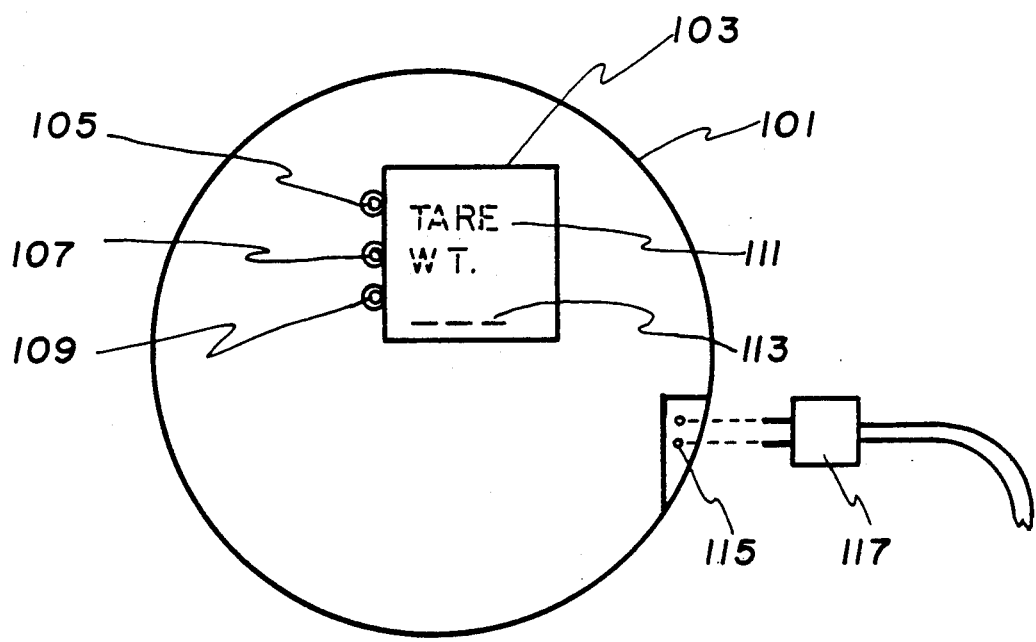
FIG. 4 shows a top view of alternative embodiment of the device of the present invention.

Referring now to FIG. 4, there is shown an alternative cap 101 having a digital display unit 103 with programming recessed buttons 105, 107 and 109. In this embodiment, the computer (not shown) contained within cap 103 is programmable by a doctor, pharmacist, dispensary person or other person to custom fit a particular need. Button 105 may be used to call up various functions which are displayed on display unit 103 such as tare weight 111 shown and includes input readout area 113 which will show particular numbers as they are fed into the computer. Button 107 may be used to input numbers sequentially after a particular function is called up with button 105. Just as with conventional automobile dashboard clocks, radios and other electronic devices which may be programmed and various functions are called up merely by depressing buttons, button 105 can be used to call up tare weight, pill weight or dosage weight for liquids, number of pills required to be taken per dosage, and number of dosages per day or number of hours between each dosage, etc. Button 109 may be used as a start button, and once it is depressed, the functions will proceed. The obvious advantages of the FIG. 4 cap 101 include not only the ability to customize the cap 101 for a particular medicine container and a particular medicine, but also, the ability to reuse the cap for repeated prescriptions and/or for different types of prescriptions with each use.

Cap 101 shown in FIG. 4 shows an optional plug inlet 115 for receiving plug 117 which may be fed to a larger computer (not shown) and the information supplied by the cap as to, perhaps, the last readout, would be sent to a large computer for information storage, for doctor compliance monitoring, for transmission to a central location such as at a hospital or a nursing home, or may otherwise be used in conjunction with larger computers with more functions.

It should be noted that the caps of the present invention are shown in general as screw on caps but could be snap caps or other type caps without exceeding the scope of the present invention. The only prerequisite is that the cap loosely fit the container in the vertical direction so that when the cap is picked up, the weight of the container pulls down upon the scale rest or rests. Further, while an arrangement of four rests are shown in FIG. 2, any number of rests could be used or a single annulus ring or other scale device which receives the weight of a container would be appropriate. Last, the particular assemblage of the cap may be one which involves fewer or more components or pieces then those shown in FIG. 2, and the exact structure would be a matter of choice for the artisan. Additionally, the cap could have an easy stick type of material on the underside of the top so that mere gravity (when the device, i.e. the cap and the container, is at rest) would cause a good seal to keep the medicine fresh without the necessity for a tightly screwed seal. Alternatively, more sophisticated sealing means such as a light foam seal which would not impact upon the weight or a magnetic seal which is broken by the mere weight of the container could also act as seals to keep the medicine fresh. However, in most applications, the cap resting on the top of the container and loosely screwed thereon would provide adequate closure to maintain the medicine in a clean, fresh fashion.

Obviously, numerous modifications and variations of the present invention are possible in light of the above teachings. It is therefore understood that within the scope of the appended claims, the invention may be practiced otherwise than as specifically described herein.

What is claimed is:
1. A cap for a medicine container for patient compliance monitoring, comprising:
  (a) a cap frame having a top, sides and one or more ledges extending inwardly from said sides, said frame further including means for removably attaching said cap to a medicine container;
  (b) scale means located at least in part on said ledges such that a medicine container to which said cap is removably attached, may be weighed by picking up said cap, with the gravitational pull of the hanging medicine container and its contents registering a weight on said scale means;

(c) a computer chip and essential circuitry connected to said scale means and located within said cap frame which is capable of generating medicine container content depletion data; and, (d) signal means for communicating said medicine container content depletion data to a patient, said signal means being functionally connected to said computer chip and being located on or in said cap frame.

2. The cap of claim 1 wherein said medicine container content depletion data is content weight depletion data and said chip is programmed to subtract actual weighed weight at any time from a start weight to determine either contents remaining or contents consumed.

3. The cap of claim 2 wherein said data includes a pill dosage count based on weight determination of pills.

4. The cap of claim 2 wherein said data includes a dosage count based on weight determination of liquid content.

5. The cap of claim 1 wherein said chip is programmed to include a timer feature which tracks required dosage consumption with actual content depletion measurements, and reports patient compliance via said signal means.

6. The cap of claim 1 wherein said signal means is a visual display mechanism.

7. The cap of claim 1 wherein said signal means is an audio signal mechanism.

8. The cap of claim 1 wherein said signal means is a combination of both a digital display unit and an audio signal mechanism.

9. The cap of claim 1 which further includes:

(e) means for connecting said cap to a plug for connecting the cap to an external computer for inputting data from said cap to said external computer.

10. The cap of claim 9 wherein said medicine container content depletion data is content weight depletion data and said chip is programmed to subtract actual weighted weight at any time from a start weight to determine either contents remaining or contents consumed.

11. The cap of claim 10 wherein said data includes a pill dosage count based on weight determination of pills.

12. The cap of claim 10 wherein said data includes a dosage count based on weight determination of liquid content.

13. The cap of claim 9 wherein said chip is programmed to include a timer feature which tracks required dosage consumption with actual content depletion measurements, and reports patient compliance via said signal means.

14. The cap of claim 9 wherein said signal means is a visual display mechanism.

15. The cap of claim 9 wherein said signal means is an audio signal mechanism.

16. The cap of claim 9 wherein said signal means is a combination of both a digital display unit and an audio signal mechanism.

* * * * *